United States Patent
Sobel

(10) Patent No.: US 7,739,278 B1
(45) Date of Patent: Jun. 15, 2010

(54) SOURCE INDEPENDENT FILE ATTRIBUTE TRACKING

(75) Inventor: William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 293 days.

(21) Appl. No.: 10/645,989

(22) Filed: Aug. 22, 2003

(51) Int. Cl.
*G06F 7/00* (2006.01)
*G06F 17/30* (2006.01)

(52) U.S. Cl. ..................................... 707/728
(58) Field of Classification Search ............... 707/3, 707/9, 10, 200, 104.1, 1; 709/205; 711/216; 726/24; 717/170
See application file for complete search history.

(56) References Cited

U.S. PATENT DOCUMENTS

| | | | |
|---|---|---|---|
| 5,398,196 A | | 3/1995 | Chambers |
| 5,452,442 A | | 9/1995 | Kephart |
| 5,495,607 A | * | 2/1996 | Pisello et al. ................. 707/10 |
| 5,572,590 A | | 11/1996 | Chess |
| 5,586,304 A | * | 12/1996 | Stupek et al. ............... 717/170 |
| 5,675,710 A | | 10/1997 | Lewis |
| 5,694,569 A | * | 12/1997 | Fischer ....................... 711/216 |
| 5,826,249 A | | 10/1998 | Skeirik |
| 5,832,208 A | * | 11/1998 | Chen et al. .................... 726/24 |
| 5,832,527 A | | 11/1998 | Kawaguchi |
| 5,854,916 A | | 12/1998 | Nachenberg |
| 5,884,033 A | | 3/1999 | Duvall et al. |
| 5,944,821 A | | 8/1999 | Angelo |
| 5,974,549 A | | 10/1999 | Golan |
| 6,006,242 A | | 12/1999 | Poole et al. |
| 6,021,510 A | | 2/2000 | Nachenberg |
| 6,023,723 A | | 2/2000 | McCormick et al. |
| 6,052,709 A | | 4/2000 | Paul |
| 6,072,942 A | | 6/2000 | Stockwell et al. |
| 6,088,803 A | | 7/2000 | Tso et al. |
| 6,092,194 A | * | 7/2000 | Touboul ....................... 726/24 |
| 6,094,731 A | | 7/2000 | Waldin et al. |
| 6,125,459 A | | 9/2000 | Andoh et al. |
| 6,161,130 A | | 12/2000 | Horvitz et al. |
| 6,167,434 A | | 12/2000 | Pang |

(Continued)

FOREIGN PATENT DOCUMENTS

EP 0636977 A2 2/1995

(Continued)

OTHER PUBLICATIONS

Burchell, Jonathan, "NetShield 1.5", Virus Bulletin, Aug. 1994, pp. 21-23, XP 000617453.

(Continued)

*Primary Examiner*—Tony Mahmoudi
*Assistant Examiner*—Paul Kim
(74) *Attorney, Agent, or Firm*—Fenwick & West LLP

(57) ABSTRACT

A non-application specific file attribute manager (101) receives (201) a plurality of files (103) in a plurality of formats. The file attribute manager (101) scans (203) the plurality of received files (103), and gleans (205) attributes concerning each of the plurality of scanned files (103). The file attribute manager (101) stores (207) gleaned attributes concerning each of the scanned files (103) as records (105) in a database (107). The file attribute manager (101) indexes (209) the records (105) according to the contents of their associated files (103).

20 Claims, 5 Drawing Sheets

U.S. PATENT DOCUMENTS

| | | | |
|---|---|---|---|
| 6,253,169 B1 | 6/2001 | Apte et al. | |
| 6,298,351 B1 | 10/2001 | Castelli et al. | |
| 6,347,310 B1 | 2/2002 | Passera | |
| 6,370,526 B1 | 4/2002 | Agrawal et al. | |
| 6,397,200 B1 | 5/2002 | Lynch et al. | |
| 6,397,215 B1 | 5/2002 | Kreulen et al. | |
| 6,401,122 B1 | 6/2002 | Matsui et al. | |
| 6,421,709 B1 | 7/2002 | McCormick et al. | |
| 6,424,960 B1 | 7/2002 | Lee et al. | |
| 6,442,606 B1 | 8/2002 | Subbaroyan et al. | |
| 6,456,991 B1 | 9/2002 | Srinivasa et al. | |
| 6,493,007 B1 | 12/2002 | Pang | |
| 6,502,082 B1 | 12/2002 | Toyama et al. | |
| 6,505,167 B1 | 1/2003 | Horvitz et al. | |
| 6,535,894 B1* | 3/2003 | Schmidt et al. | 707/204 |
| 6,546,416 B1 | 4/2003 | Kirsch | |
| 6,721,721 B1 | 4/2004 | Bates et al. | |
| 6,751,789 B1 | 6/2004 | Berry et al. | |
| 6,772,346 B1 | 8/2004 | Chess et al. | |
| 6,842,861 B1 | 1/2005 | Cox et al. | |
| 6,886,099 B1 | 4/2005 | Smithson et al. | |
| 6,944,555 B2 | 9/2005 | Blackett et al. | |
| 6,952,779 B1 | 10/2005 | Cohen et al. | |
| 6,973,578 B1 | 12/2005 | McIchionc | |
| 7,024,403 B2 | 4/2006 | Kyler | |
| 2002/0035693 A1 | 3/2002 | Eyres et al. | |
| 2002/0038308 A1 | 3/2002 | Cappi | |
| 2002/0046207 A1* | 4/2002 | Chino et al. | 707/3 |
| 2002/0073046 A1 | 6/2002 | David | |
| 2002/0087649 A1 | 7/2002 | Horvitz | |
| 2002/0138525 A1 | 9/2002 | Karadimitriou et al. | |
| 2002/0147694 A1 | 10/2002 | Dempsey et al. | |
| 2002/0147782 A1 | 10/2002 | Dimitrova et al. | |
| 2002/0178375 A1 | 11/2002 | Whittaker et al. | |
| 2002/0194488 A1 | 12/2002 | Cormack et al. | |
| 2002/0194489 A1 | 12/2002 | Almogy et al. | |
| 2002/0199186 A1 | 12/2002 | Ali et al. | |
| 2002/0199194 A1 | 12/2002 | Ali | |
| 2003/0023875 A1 | 1/2003 | Hursey et al. | |
| 2003/0033587 A1 | 2/2003 | Ferguson et al. | |
| 2003/0061287 A1* | 3/2003 | Yu et al. | 709/205 |
| 2003/0065926 A1 | 4/2003 | Schultz et al. | |
| 2003/0110280 A1 | 6/2003 | Hinchliffe et al. | |
| 2003/0110393 A1 | 6/2003 | Brock et al. | |
| 2003/0110395 A1 | 6/2003 | Presotto et al. | |
| 2003/0115458 A1 | 6/2003 | Song | |
| 2003/0115479 A1 | 6/2003 | Edwards et al. | |
| 2003/0154394 A1 | 8/2003 | Levin | |
| 2003/0167402 A1 | 9/2003 | Stolfo et al. | |
| 2003/0233352 A1* | 12/2003 | Baker | 707/3 |
| 2004/0015554 A1 | 1/2004 | Wilson | |
| 2004/0039921 A1 | 2/2004 | Chuang | |
| 2004/0103310 A1 | 5/2004 | Sobel et al. | |
| 2004/0117401 A1* | 6/2004 | Miyata et al. | 707/104.1 |
| 2004/0117641 A1 | 6/2004 | Kennedy et al. | |
| 2004/0220975 A1* | 11/2004 | Carpentier et al. | 707/200 |
| 2005/0060281 A1* | 3/2005 | Bucher et al. | 707/1 |

FOREIGN PATENT DOCUMENTS

| | | |
|---|---|---|
| EP | 1408393 A2 | 4/2004 |
| WO | WO 93/25024 A1 | 12/1993 |
| WO | WO 99/15966 A1 | 4/1999 |
| WO | WO 00/28420 A2 | 5/2000 |
| WO | WO 02/33525 A2 | 4/2002 |

OTHER PUBLICATIONS

Morar, J. E. and Chess, D. M., "Can Cryptography Prevent Computer Viruses?", Virus Bulletin Conference 2000, Sep. 2000, pp. 127-138, Virus Bulletin Ltd., Oxfordshire, England.

Wikipedia.org web pages [online], Wikipedia, [retrieved Mar. 17, 2003] Retrieved from the Internet: <ULR: http://www.wikipedia.org/w/wiki.phintl?title=machine learning and printable=yes>.

Outlook.spambully.com web pages [online] Spam Bully [retrieved Jan. 16, 2003] Copyright 2002, Retrieved from the Internet <URL: http://outlook.spambully.com/about.php>.

"Enterprise Protection Strategy" [online] Trend Micro Inc. [retrieved Dec. 3, 2002] Retrieved from the Internet: <URL: http://www.trendmicro.com/en/products/eps/features.htm>.

"How to Test Outbreak Commander", :Trend Micro Inc., Aug. 2002, pp. 1-13, Cupertino, CA.

Choi, Yang-Seo, et al., "A New Stack Buffer Overflow Hacking Defense Technique with Memory Address Confirmation", Lecture Notes in Computer Science 2288, 2002, pp. 146-159, Spinger Verlog, Berlin and Heidelsberg, Germany.

Chew, Monica and Dawn Song, "Mitigating Buffer Overflows by Operating System Randomization", Dec. 2000, pp. 1-9, U.C. Berkeley, CA USA.

Bolosky, W., Corbin, S., Goebel, D., and Douceur, J., "Single Instance Storage in Windows 2000", Microsoft Research, Balder Technology Group, Inc., [online] [retrieved Oct. 11, 2002] Retrieved from the Internet <URL: http://research.microsoft.com/sn/farsite/wss2000.pdf>.

Bontchev, Vesselin, "Possible Macro Virus Attacks and How to Prevent Them", Computer & Security, vol. 15, No. 7, pp. 595-626, 1996.

Parkhouse, Jayne, "Pelican SafeTNet 2.0" [online], Jun. 2000, SC Magazine Product Review, [retrieved on Dec. 1, 2003]. Retrieved from the Internet: <URL: http://www.scmagazine.com/scmagazine/standalone/pelican/sc_pelican.html.

* cited by examiner

SOURCE INDEPENDENT FILE ATTRIBUTE TRACKING

TECHNICAL FIELD

This invention pertains generally to computer file analysis, and more specifically to application independent gleaning of attributes concerning files in multiple formats.

BACKGROUND ART

It is useful for computers connected to networks to scan incoming files and store associated file attributes. An attribute concerning a file can comprise any piece of information relevant to that file, such as its source, name, size or type. Stored file attributes can be useful both to the computer user and to various application programs. The user may want a record detailing files that were transmitted to a computer or that entered the computer's file system from external sources. Such information can also be utilized by various automated processes, such as a malicious computer code blocking system.

Computers connected to networks are vulnerable to network based malicious computer code attacks, such as worms, viruses and Trojan horses. As used herein, "malicious computer code" is any code that enters a computer without an authorized user's knowledge and/or without an authorized user's consent. Various blocking systems exist which attempt to block incoming malicious computer code. Information concerning past and present incoming files can be used by such systems to determine which files to block.

Some existing systems scan incoming files, and determine and store the name of the originating application (e.g., outlook.exe, iexplore.exe). However, such systems have no knowledge of the various file formats generated by different applications, and are unable to obtain further information about the files (e.g., the URL visited, an attachments sender's address).

What is needed are methods, computer readable media and systems that can glean and store file attributes concerning incoming files in a variety of formats, regardless of which applications generated the files.

DISCLOSURE OF INVENTION

The present invention comprises methods, computer readable media, and systems for gleaning file attributes independently of file format. A non-application specific file attribute manager (101) receives (201) a plurality of files (103) in a plurality of formats. The file attribute manager (101) scans (203) the plurality of received files (103), and gleans (205) attributes concerning each of the plurality of scanned files (103). The file attribute manager (101) stores (207) gleaned attributes concerning each of the plurality of scanned files (103) as records (105) in a database (107). The file attribute manager (101) indexes (209) the records (105) according to the contents of their associated files (103).

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
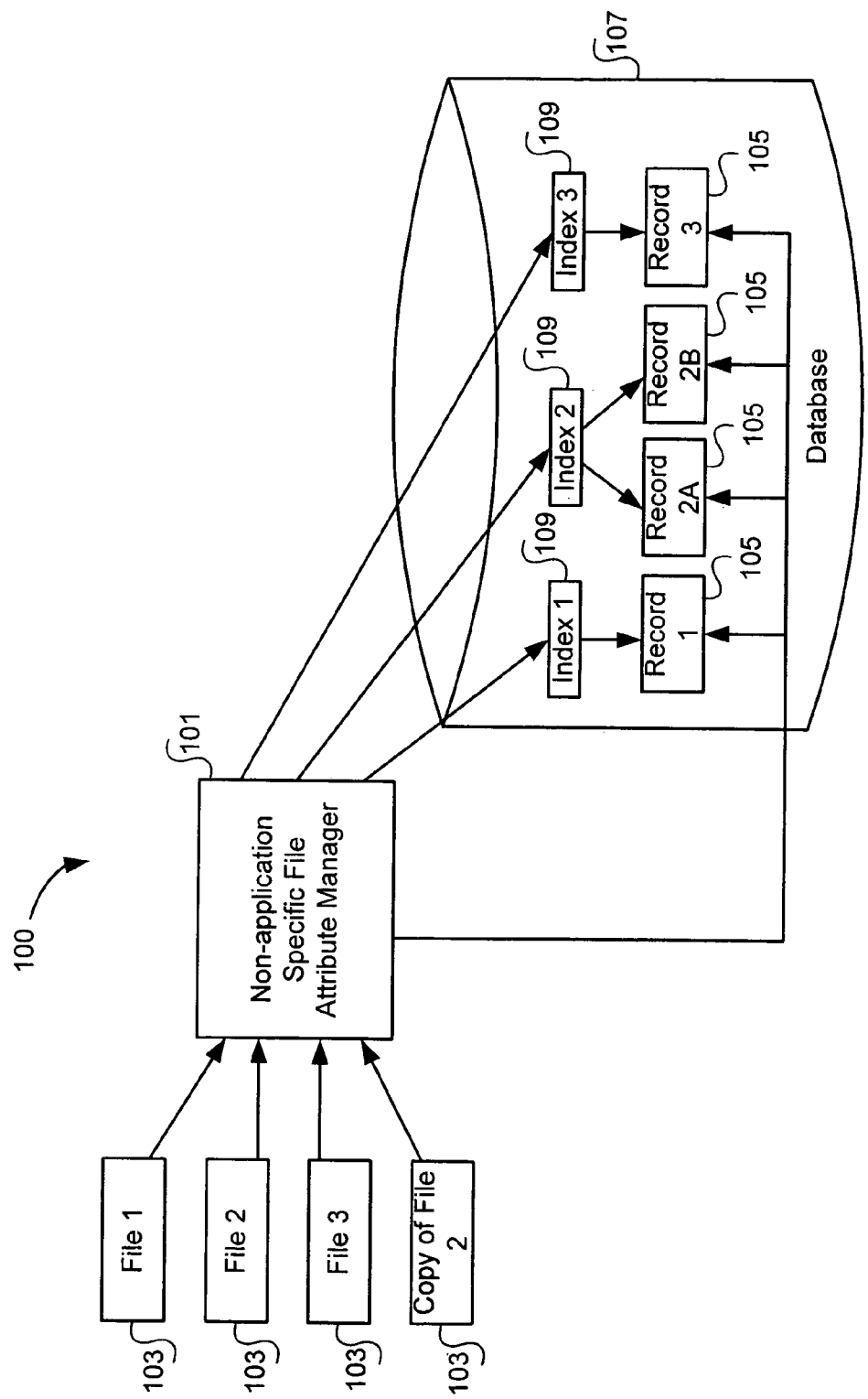
FIG. 1 is a block diagram illustrating a high level overview of a system for practicing some embodiments of the present invention.

FIG. 1 illustrates a high level overview of a system 100 for performing some embodiments of the present invention. A non-application specific file attribute manager 101 receives incoming files 103 in a plurality of formats. The incoming files 103 can be received, for example, from a network connection or an external medium, such as a CD-ROM. The incoming files 103 can be generated by a wide variety of different application programs (e.g., word processors, spreadsheet programs, HTML editors, compilers, etc.), and thus can be in a wide variety of different file formats.

The non-application specific file attribute manager 101 scans the incoming files 103, regardless of their format. It is to be understood that this scanning can be done in conjunction with an additional function, such as anti-virus scanning of the incoming files 103, or as an independent process. Either way, the file attribute manager 101 gleans attributes concerning each of the plurality of scanned files 103 in the plurality of formats. Attributes can comprise any information concerning the file, such as its size, its source, its name, etc. In some embodiments, the specific attributes to glean concerning a specific file 103 are a function of the protocol according to which the file 103 was transmitted. For example, a file 103 could be received according to Simple Mail Transfer Protocol (e.g., an incoming e-mail message). In that case, it could be appropriate to glean attributes such as the sender's address, the subject line and the digital signature status, as well as more universal attributes such as size and file name. In other embodiments, the specific attributes to glean concerning a specific file 103 are a function of the file 103 format. It is to be understood that the examples of attributes to glean as well as the associated gleaning criteria discussed herein are not all inclusive. Other examples will be readily apparent to those of ordinary skill in the relevant art in light of this specification. Which attributes to glean concerning which files 103 is a design choice.

The file attribute manager 101 stores gleaned attributes as records 105 in a database 107, such that a record 105 is created for each receipt of a file 103 of interest. Each record 105 stores at least some of the gleaned attributes. In some embodiments, the file attribute manager 101 stores all of the gleaned attributes, and in other embodiments the file attribute manager stores various subsets of the gleaned attributes, as desired. Which attributes concerning which files 103 to store is a design choice.

The file attribute manager 101 indexes the attributes being stored as records 105 in the database 107 according to the contents of their associated files 103. In one embodiment, an index 109 is based on a secure hash of the associated file 103. In another embodiment, indexes 109 are based on cyclical redundancy checks of the associated files 103. Of course, other techniques for creating indexes 109 based on file contents are possible, and all such techniques are within the scope of the present invention. In any case, the indexes 109 can be subsequently used to retrieve stored database records 105 concerning files 103 for desired processing, for example by a blocking system.

As illustrated in FIG. 1, the file attribute manager 101 can receive multiple copies of the same file 103. In FIG. 1, the file attribute manager 101 receives two copies of File 2. When the file attribute manager 101 receives multiple copies of the same file 103, the file attribute manager 101 stores a separate database record 105 for each received copy, each record being indexed according to the contents of the file 103. That way, each record 105 concerning the file 103 can be accessed by the single index 109. Later, a blocking system or other program analyzing received files can retrieve all available information on each copy of the received file 103 via the single index 109. This can be important, because the different copies of the received file 103 can have different attributes, for example because they were received from different sources. It is desirable to be able to determine that the separate records 105 map to different copies of the same file 103, so as to be able to perform a complete analysis thereon. In FIG. 1, attributes concerning the two copies of File 2 are stored as Record 2A and Record 2B, both of which are pointed to by Index 2.

It is to be understood that although the non-application specific file attribute manager 101 is illustrated as a single entity, as the term is used herein a non-application specific file attribute manager 101 refers to a collection of functionalities which can be implemented as software, hardware, firmware or any combination of the three. Where a non-application specific file attribute manager 101 is implemented as software, it can be implemented as a standalone program, but can also be implemented in other ways, for example as part of a larger program, as a plurality of separate programs, or as one or more statically or dynamically linked libraries.

In some embodiments the non-application specific file attribute manager 101 is incorporated into a server computer. In other embodiments, the non-application specific file attribute manager 101 is incorporated into a gateway or a client computer. In yet other embodiments, the non-application specific file attribute manager 101 is incorporated into other components as desired, for example a firewall, an intrusion detection system, an intrusion detection system application proxy, a router, one or more switch(es) and/or a standalone proxy. In some embodiments, the non-application specific file attribute manager 101 is distributed between or among more than one of the above and/or other components.

Figure 2:
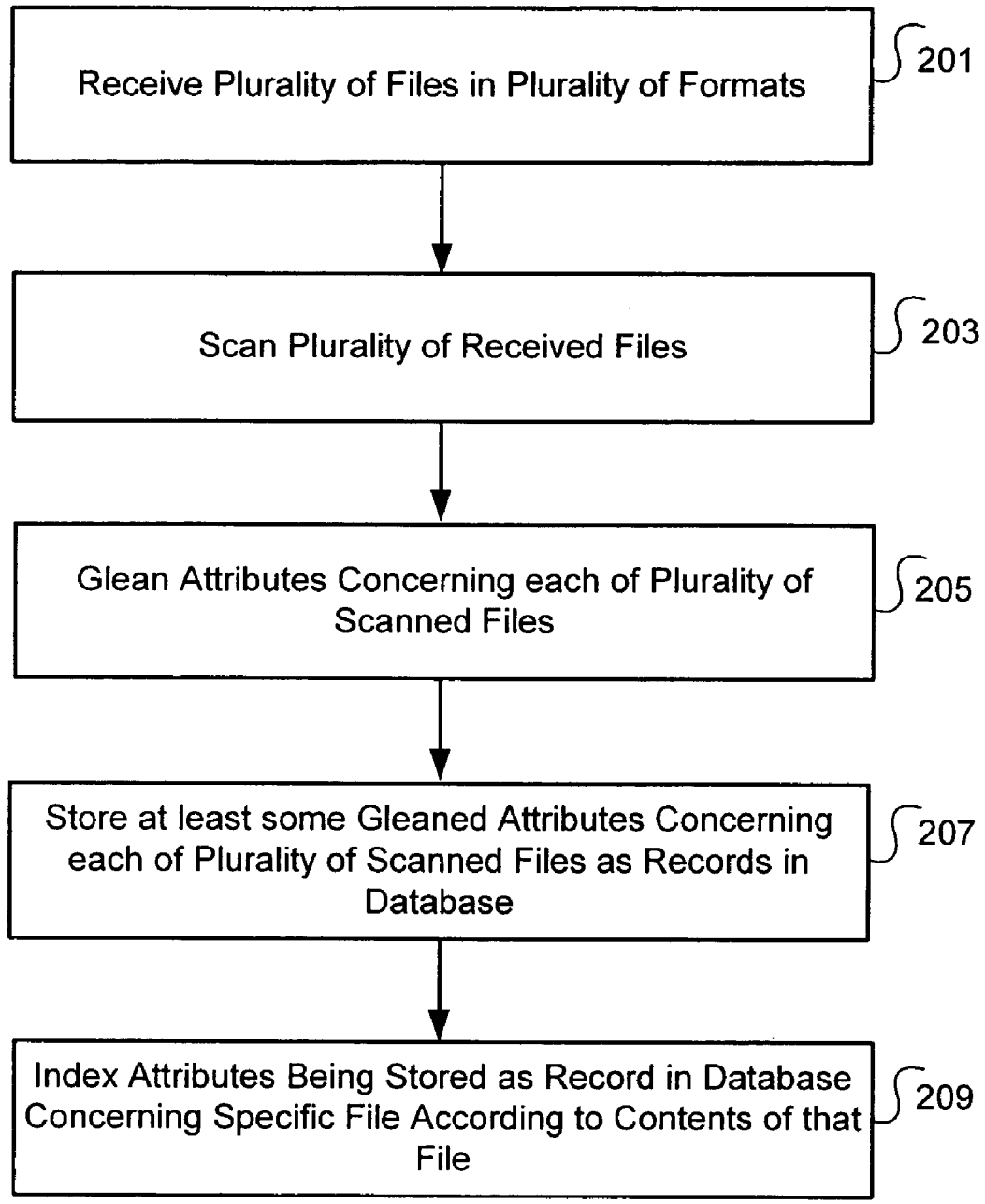
FIG. 2 is a flowchart illustrating steps for performing some embodiments of the present invention.

FIG. 2 illustrates steps for performing some embodiments of the present invention. As described above in conjunction with FIG. 1, the non-application specific file attribute manager 101 receives 201 a plurality of files 103 in a plurality of formats. The file attribute manager 101 scans 203 the plurality of received files 103, and gleans 205 attributes concerning each of the plurality of scanned files 103. As discussed above, the file attribute manager 101 stores 207 at least some gleaned attributes concerning each of the plurality of scanned files 103 as records 105 in a database 107, indexing 209 the records 105 according to the contents of their associated files 103.

Figure 3:
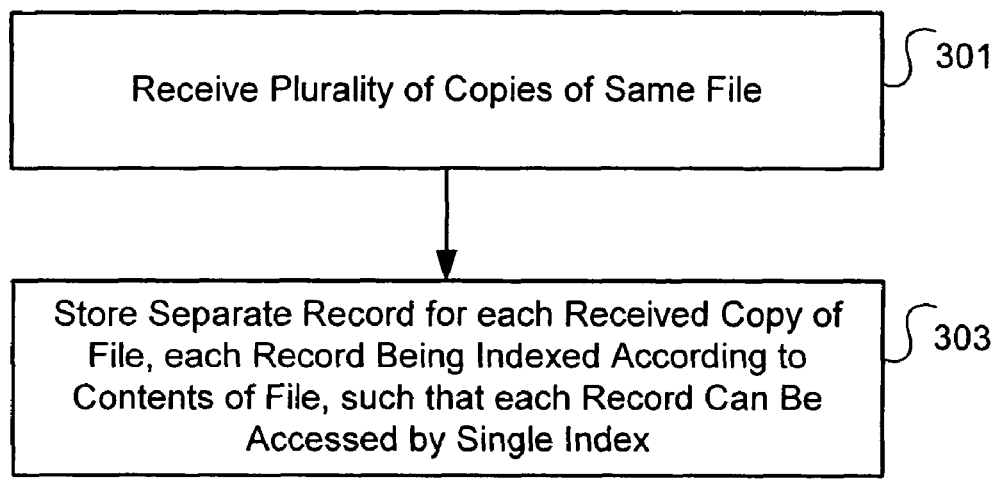
FIG. 3 is a flowchart illustrating steps for processing the receipt of multiple copies of the same file, according to some embodiments of the present invention.

FIG. 3 illustrates steps for processing the receipt of multiple copies of the same file 103, according to some embodiments of the present invention. The file attribute manager 101 receives 301 a plurality of copies of the same file 103. As described above, the file attribute manager stores 303 a separate record 105 for each received copy of the file 103, each record 105 being indexed 209 according to the contents of the file 103, such that each record 105 can be accessed by the single index 109.

Figure 4:
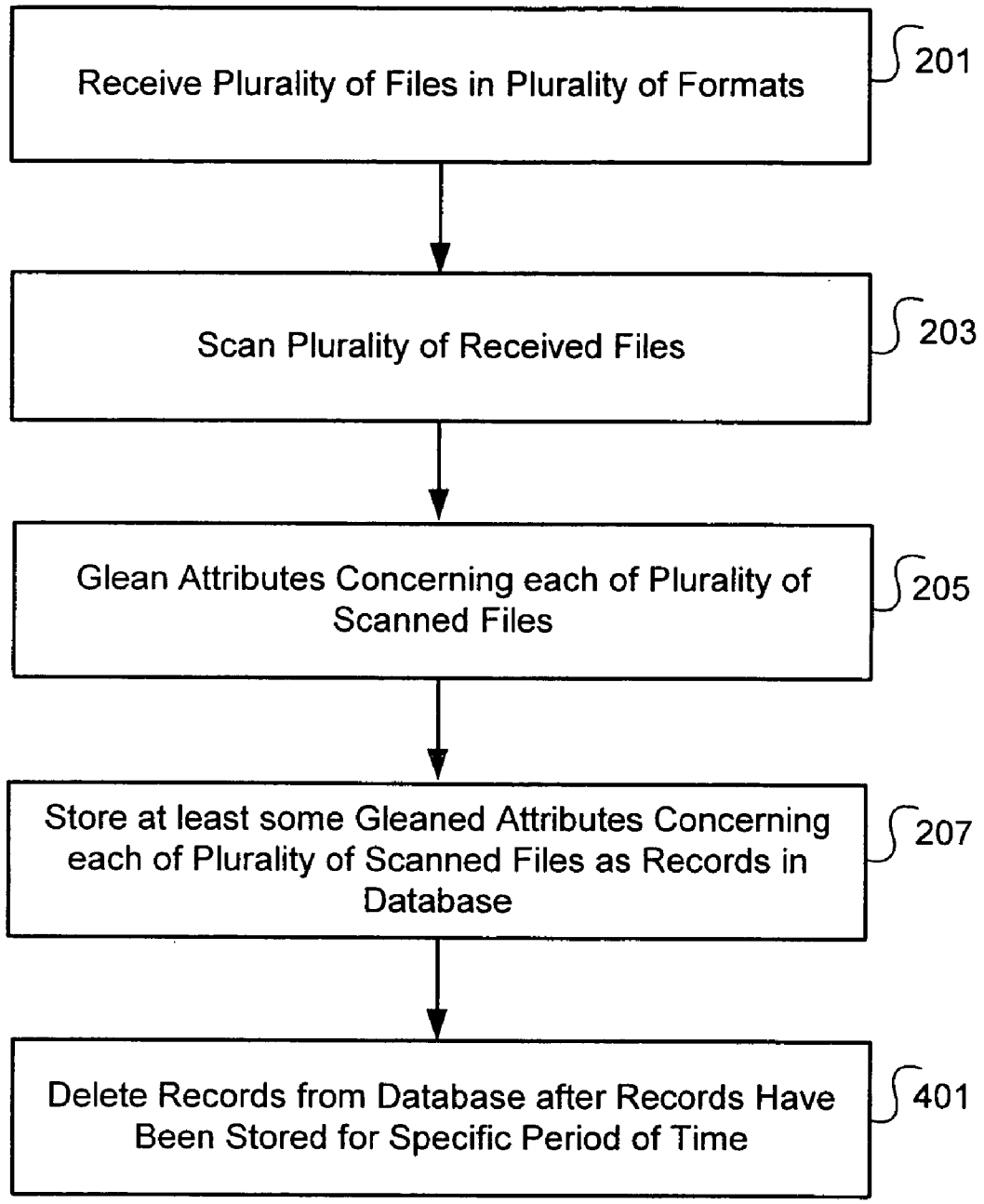
FIG. 4 is a flowchart illustrating steps for automatically deleting old records from the database, according to some embodiments of the present invention.

In some embodiments of the present invention, the file attribute manager 101 automatically deletes old records 105 from the database 107, ensuring that the database 107 is kept current and free of obsolete records 105. FIG. 4 illustrates steps for automatically deleting old records 105 from the database 107, according to some embodiments of the present invention. As discussed in conjunction with FIG. 2, the non-application specific file attribute manager 101 receives 201 a plurality of files 103 in a plurality of formats. The file attribute manager 101 scans 203 the plurality of received files 103, and gleans 205 attributes concerning each of the plurality of scanned files 103. The file attribute manager 101 then stores 207 at least some gleaned attributes concerning each of the plurality of scanned files 103 as records 105 in a database 107. To keep the database 107 current, the file attribute manager 101 deletes 401 records 105 from the database 107 after the records 105 have been stored for a specific period of time. The specific period of time for which to store records 105 before deleting 401 them is a design choice.

Figure 5:
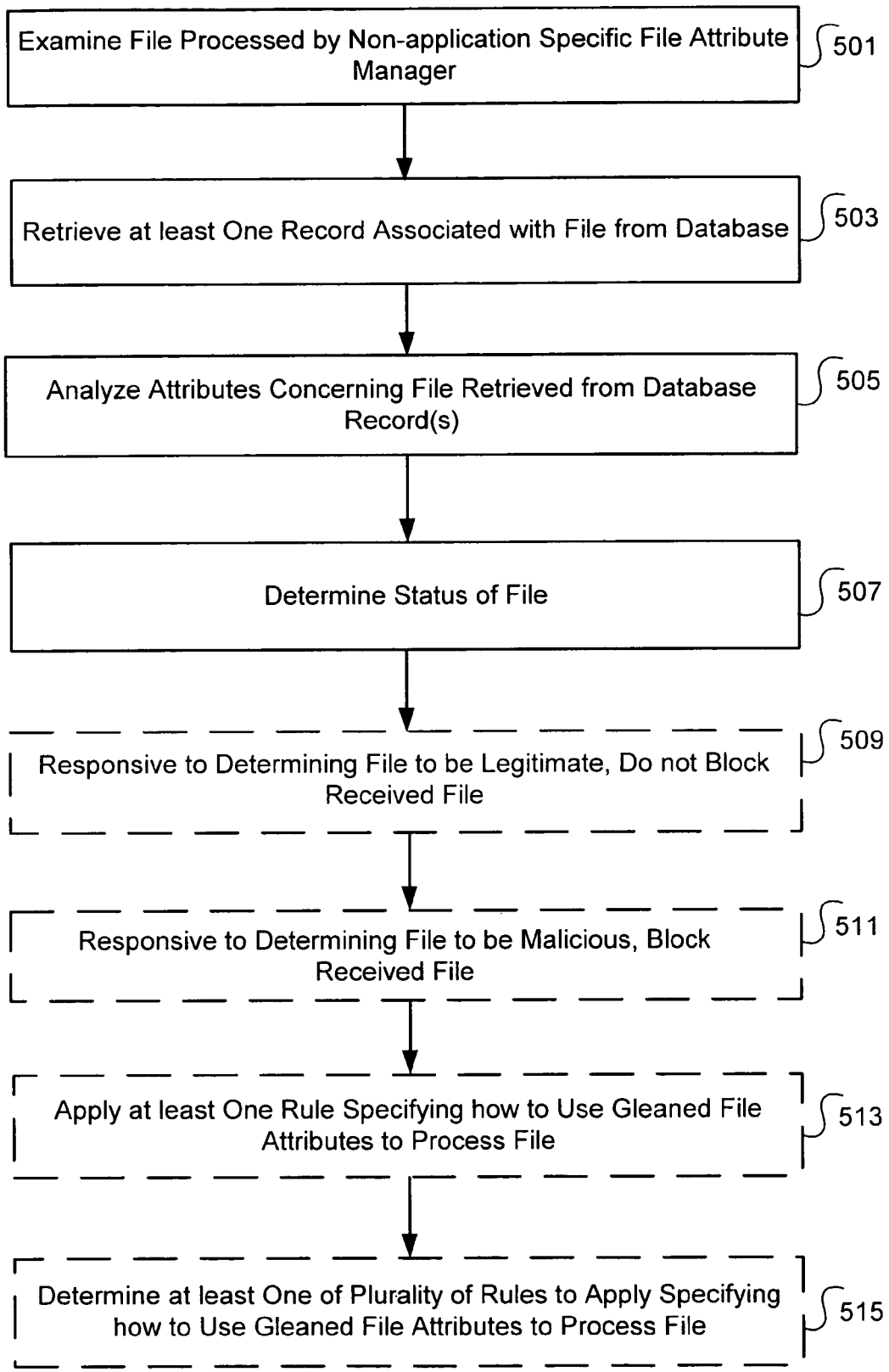
FIG. 5 is a flowchart illustrating steps for a behavior blocking system to utilize gleaned file attributes according to some embodiments of the present invention.

FIG. 5 illustrates steps for a behavior blocking system to utilize gleaned file 103 attributes according to some embodiments of the present invention. The blocking system examines 501 a file 103, which has already been scanned 203 as described above. In order to determine whether to block the incoming file 103 (e.g., from entering the computer, from executing, from performing certain functions while executing, etc.), the blocking system utilizes the index 109 based on the contents of the file 103 in order to retrieve 503 the associated record(s) 105 in the database 107. The blocking system proceeds to analyze 505 the attributes concerning the file 103 retrieved from the stored record(s) 105, and determines 507 a status of the file. This status can be used to determine how to process the file 103. In some embodiments, the blocking system determines 507 that the file is legitimate and does not block 509 the file 103 (e.g., the blocking system allows the file 103 to enter the computer, or to execute, or to perform some other function). In other embodiments, the blocking system determines 507 that the file 103 is malicious, and blocks 511 the file 103 as appropriate.

As an example, the system 100 could first receive 201 an e-mail attachment "badfile.exe," which is known by name to contain malicious code. During the processing of the file 103 as described above in conjunction with FIG. 2, relevant attributes concerning the file 103 will be gleaned 205 and stored 207 in a database 107 record 105, indexed 209 according to the contents of the file 103. The blocking system would then block 511 the file 103 from entering the computer, because of its known malicious status.

Later, suppose the same malicious file 103 is transmitted to the computer from another source, under the name "goodfile.exe." Because of the renaming of the file, the blocking system will not be able to identify it as being malicious based on its name alone. However, the system will scan 203 the file 103, and glean 205 and store 207 relevant attributes. When the blocking system receives 501 the malicious file 103, it will use the index 109 based on the file 103 contents to retrieve 503 the associated records 105 in the database 107. By analyzing 505 the file 103 attributes in the retrieved records 105, the blocking system can determine 507 that the received "goodfile.exe" is actually the same file 103 as "badfile.exe," a known malicious file 103. Accordingly, the blocking system will block 511 "goodfile.exe" from entering the computer.

In some embodiments, rules can be written, specifying to use gleaned file 103 attributes to process files 103 in specific ways. For example, a rule could specify to always allow executable fields 103 attached to signed e-mails from trusted sources to execute without restriction. As explained above, the same file 103 can be received from multiple sources (or from the same source via multiple channels). When this occurs, multiple records 105 are stored 207 in the database 107 accordingly. The rule system can determine which rules (s) to apply 513 (most restrictive, least restrictive, etc.) when multiple records 105 exist. Similarly, specific rules to apply 515 when a plurality of rules exist, and the specific manner in which to apply 515 them are variable design choices.

Of course, these are only examples of how a blocking system can use gleaned file 103 attributes in determining 507 which files 103 to block 511. Other examples will be readily apparent to those of ordinary skill in the relevant art in light of this specification. It will also be readily apparent to those of ordinary skill in the relevant art in light of this specification that a blocking system is only one type of system that can utilize file 103 attributes gleaned according to the present invention of course, such gleaned attributes can be used by any type of system for any type of file analysis, as desired.

It will be understood by those of ordinary skill in the relevant art in light of this specification that the present invention enables non-application specific gleaning and storing of file attributes, such that the stored file attributes can be later by utilized for analysis, for example by a blocking system.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for gleaning file attributes independently of file format, the method comprising the steps of:

a non-application-specific file attribute manager receiving a plurality of files in a plurality of formats, the plurality of files including a plurality of copies of a selected file from the plurality of files;

the file attribute manager scanning the plurality of received files in the plurality of formats;

the file attribute manager gleaning file attributes from each of the plurality of scanned files based on a communications protocol used to receive each of the plurality of files, the file attribute manager gleaning different file attributes for different communications protocols;

the file attribute manager storing the file attributes gleaned from each of the plurality of scanned files as a plurality of records in a database;

the file attribute manager indexing specific file attributes gleaned from specific files according to contents of the specific files, the specific file attributes being stored as ones of the plurality of records in the database;

the file attribute manager storing a record for each of the plurality of copies of the selected file, each separate record indexed according to the contents of the selected file from the plurality of files, such that each separate record can be accessed by a single index;

examining one of the plurality of files;

retrieving from the plurality of records in the database a first record associated with the examined one of the plurality of files;

retrieving from the plurality of records in the database a second record associated with a malicious file;

analyzing the gleaned file attributes gleaned from the examined one of the plurality of files, the gleaned file attributes having been retrieved from the first record;

analyzing one or more attributes of the malicious file, the one or more attributes of the malicious file having been gleaned from the second record; and determining whether a status of the examined one of the plurality of files is malicious, responsive to analyzing the gleaned file attributes and the one or more attributes of the malicious file.

2. The method of claim 1 wherein:

specific types of file attributes are gleaned from a specific file as a function of a format of the specific file.

3. The method of claim 1 wherein the file attribute manager indexing specific file attributes indexes according to a secure hash of the contents of each specific file.

4. The method of claim 1 wherein the file attribute manager indexing specific file attributes indexes according to a cyclical redundancy check of the contents of each specific file.

5. The method of claim 1 further comprising:

deleting records from the database after the records have been stored for a specific period of time.

6. The method of claim 1 wherein the non-application-specific file attribute manager is incorporated into one selected from the group consisting of:

a firewall;

an intrusion detection system;

an intrusion detection system application proxy;

a router;

a switch;

a standalone proxy;

a server;

a gateway;

an anti-virus detection system; and a client.

7. A non-transitory computer-readable storage medium containing a computer program product for gleaning file attributes independently of file format, the computer program product comprising program code for:

receiving a plurality of files in a plurality of formats, the plurality of files including a plurality of copies of a selected file from the plurality of files;

scanning the plurality of received files in the plurality of formats;

gleaning file attributes from each of the plurality of scanned files based on a communications protocol used to receive each of the plurality of files, the file attribute manager gleaning different file attributes for different communications protocols;

storing the file attributes gleaned from each of the plurality of scanned files as a plurality of records in a database;

indexing specific file attributes gleaned from specific files according to contents of the specific files, the specific file attributes being stored as ones of the plurality of records in the database;

storing a record for each of the plurality of copies of the selected file, each separate record indexed according to the contents of the selected file from the plurality of files, such that each separate record can be accessed by a single index;

examining one of the plurality of files;

retrieving from the plurality of records in the database a first record associated with the one of the examined plurality of files;

retrieving from the plurality of records in the database a second record associated with a malicious file;

analyzing the gleaned file attributes gleaned from the examined one of the plurality of files, the gleaned file attributes having been retrieved from the first record;

analyzing one or more attributes of the malicious file, the one or more attributes of the malicious file having been gleaned from the second record; and determining whether a status of the examined one of the plurality of files is malicious, responsive to analyzing the gleaned file attributes and the one or more attributes of the malicious file.

8. The computer program product of claim 7 further comprising:

program code for gleaning specific types of file attributes from a specific file as a function of a format of the specific file.

9. The computer program product of claim 7 wherein the program code for indexing file attributes indexes according to a secure hash of the contents of each specific file.

10. The computer program product of claim 7 wherein the program code for indexing file attributes indexes according to a cyclical redundancy check of the contents of each specific file.

11. The computer program product of claim 7 further comprising:

program code for deleting records from the database after the records have been stored for a specific period of time.

12. A computer system for gleaning file attributes independently of file format, the computer system having a non-transitory computer readable storage medium storing computer-executable instructions, the computer-executable instructions comprising:

a reception module, configured to receive a plurality of files in a plurality of formats, the plurality of files including a plurality of copies of a selected file from the plurality of files;

a scanning module, configured to scan the plurality of received files in the plurality of formats, the scanning module communicatively coupled to the reception module;

a gleaning module, configured to glean file attributes from each of the plurality of scanned files based on a communications protocol used to receive each of the plurality of files, the file attribute manager gleaning different file attributes for different communications protocols, the gleaning module communicatively coupled to the scanning module;

a storage module, configured to store file attributes gleaned from each of the plurality of scanned files as a plurality of records in a database, the storage module communicatively coupled to the gleaning module;

an indexing module, configured to index specific file attributes gleaned from specific files according to contents of the specific files, the specific file attributes being stored as ones of the plurality of records in the database, the indexing module communicatively coupled to the storage module;

the storage module, further configured to store a record for each of the plurality of copies of the selected file, each separate record indexed according to the contents of the selected file from the plurality of files, such that each separate record can be accessed by a single index;

an examining module, configured to examine one of the plurality of files, the examining module communicatively coupled to the storage module;

a retrieval module, configured to retrieve from the plurality of records in the database a first record associated with the examined one of the plurality of files, the retrieval module communicatively coupled to the examining module and the storage module;

the retrieval module, also configured to retrieve from the plurality of records in the database a second record associated with a malicious file;

an analysis module, configured to analyze the gleaned file attributes gleaned from the examined one of the plurality of files, the gleaned file attributes having been retrieved from the first record; the analysis module communicatively coupled to the retrieval module;

the analysis module, also configured to analyze one or more attributes of the malicious file, the one or more attributes of the malicious file having been gleaned from the second record; and a status module, configured to determine whether a status of the examined one of the plurality of files is malicious, responsive to analyzing the gleaned file attributes and the one or more attributes of the malicious file, the status module communicatively coupled to the analysis module.

13. The computer system of claim 12 wherein:

the gleaning module is further configured to glean specific types of file attributes from a specific file as a function of a format of the specific file.

14. The computer system of claim 12 wherein the indexing module is further configured to index specific file attributes according to a secure hash of the contents of each specific file.

15. The computer system of claim 12 wherein the indexing module is further configured to index specific file attributes according to a cyclical redundancy check of the contents of each specific file.

16. The method of claim 1 further comprising:

responsive to determining the status of the examined one of the plurality of files to be malicious, blocking the examined one of the plurality of files.

17. The method of claim 1 further comprising:
responsive to determining the status of the examined one of the plurality of files to be legitimate, not blocking the examined one of the plurality of files.

18. The method of claim 1 further comprising:
applying at least one rule specifying how to use the gleaned file attributes to process the examined one of the plurality of files.

19. The method of claim 18 further comprising:
selecting the at least one rule from a plurality of rules to apply specifying how to use the gleaned file attributes to process the examined one of the plurality of files.

20. The method of claim 1, wherein the plurality of files are received from a network connection.

\* \* \* \* \*